United States Patent [19]

Brodes et al.

[11] 3,812,291

[45] May 21, 1974

[54] SIGNAL PATTERN ENCODER AND CLASSIFIER

[75] Inventors: Donald L. Brodes, Fairfax; Myron H. Hitchcock, Reston, both of Va.

[73] Assignee: Scope Incorporated, Reston, Va.

[22] Filed: June 19, 1972

[21] Appl. No.: 263,849

[52] U.S. Cl........................... 179/1 SA, 179/15.55 T

[51] Int. Cl............................................... G10l 1/00

[58] Field of Search........... 179/1 SA, 1 SB, 1 VS, 179/15.55 T, 15.55 R; 340/146.3 T

[56] References Cited

UNITED STATES PATENTS

| | | | |
|---|---|---|---|
| 3,582,559 | 6/1971 | Hitchcock | 179/15.55 T |
| 3,509,280 | 4/1970 | Jones | 179/1 SB |
| 3,147,343 | 9/1964 | Meyer | 179/1 SA |
| 3,344,233 | 9/1967 | Tufts | 179/1 SA |
| 3,395,249 | 7/1968 | Clapper | 179/1 SA |

OTHER PUBLICATIONS

Clapper, Connected Word Recognition System, IBM Technical Disclosure Bulletin, 12/69 pp. 1123–1126.

*Primary Examiner*—Kathleen H. Claffy
*Assistant Examiner*—Jon Bradford Leaheey

[57] ABSTRACT

A device for encoding and classifying signal data obtained from a multiplicity of property filters. A fixed length binary pattern is produced for each signal input. This binary pattern provides the input to a pattern classifier which is organized for a particular classification task by an estimation process that combines a multiplicity of binary patterns into a standard reference pattern. Classification is accomplished by comparing binary encoded patterns generated by signal occurrences with previously generated reference patterns.

13 Claims, 7 Drawing Figures

BINARY ENCODER

F1 – F16 OUTPUT OF CODING COMPRESSOR
C1 – C15 VOLTAGE COMPARATORS
A1 – A14 SUMMING AMPLIFIERS
BIT 1 – BIT 15 TO REFERENCE PATTERN MEMORY

| V IN | V OUT |
|---|---|
| 0 | 5 |
| 1 | 4 |
| 2 | 3 |
| 3 | 3 |
| 4 | 4 |
| 5 | 5 |

D: DIFFERENCE LOGIC
C: VOLTAGE COMPARATOR
I: INVERTER

SIGNAL PATTERN ENCODER AND CLASSIFIER

The present invention relates generally to a signal encoder and classifier and more specifically to such an encoder and classifier for signal data obtained from a multiplicity of property filters.

One particular function of the present invention is in its use relative to automatic speech interpretation. Such use will be used for illustrative and descriptive purposes.

Therefore, in order to place the descriptive matter in its proper perspective, the following discussion of currently available technology that may be applied to solve immediate problems in automatic speech interpretation is presented herewith.

Recently, a number of systems have been developed to be specifically applied to tasks involving limited vocabulary speech recognition. These developments by no means cover all current reseach effort devoted to automatic speech recognition, but represent those efforts directed toward immediate applications. The systems mentioned typically achieve recognition scores above 90 percent for vocabularies of from 10 to 100 words. In the following paragraphs we will briefly discuss the techniques employed in each of these systems.

There are essentially three types of models on which automatic speech recognition procedures have been based. These are perceptual models, articulatory models and acoustic models. The articulatory and perceptual models are frequently combined with linguistic models for language production and perception.

Certainly the most exhaustively investigated model is the perceptual model in which the spoken language is broken down into a finite set of perceived sound types called phonemes. There are approximately 40 such phonemes that are used to describe spoken English. Attempts have been made to find unique acoustic correlates of each of the phonemes and build a recognition system that first identifies the phoneme structure of an utterance and then combines phoneme strings into words or phrases. No one has been completely successful at this task in spite of almost twenty years of effort. In fact, there is substantial evidence against the existence of unique acoustic correlates of the phonemes. However, certain broader categorizations of sound types motivated by the phoneme model and generally related to articulatory parameters can be achieved. A limited vocabulary recognition system can then be realized provided that the vocabulary is distinct in terms of the sound types. This approach has been followed in developing two limited vocabulary recognition systems. One system recognizes sequences of spoken digits, the other a 13 word machine control vocabulary. The advantages gained by working with a small set of sound types are the resulting economy in the acoustic pattern recognition equipment and the ability to recognize connected strings of utterances as well as acoustically isolated utterances. The techniques employed have not been demonstrated with larger vocabularies, however, and the systems are not readily adapted to new vocabularies, large or small.

There has also been developed a limited speech recognition program that has been operated alternately with 15 linguistic features motivated by articulatory considerations and with 29 purely acoustic features of the speech power spectrum. In each case, isolated speech utterances are recognized on the basis of the sequences of binary feature states (presence or absence of a feature) generated by the various feature detectors. Since the feature sequences can vary significantly from utterance to utterance, even from the same speaker, a second level of decision is required to associate a particular feature sequence with the proper decision category. This is accomplished by a "voting" procedure that allows for considerable variability in a given speaker's utterance. This system, however, is very sensitive to variations between speakers and must be trained for a given speaker in order to attain high accuracy. The system can be reprogrammed for new English vocabularies with hardware modifications. The system has been tested with a variety of vocabularies of from 38 to 109 utterances. It works only with acoustically isolated utterances since the complete utterance pattern is analyzed as a single entity. The system further requires a large bandwidth, 80 Hz to 6.5 KHz.

Additionally, there has been developed a limited vocabulary speech recognition system that has been demonstrated as a digit recognizer. The unique feature of this system is the reduction of the speech input to three slowly varying parameters that are claimed to be perceptually significant. While the system for digit recognition is quite small and is inexpensive, it is not easily adapted to new vocabularies since hardware changes are required. Also, the capability of working with larger vocabularies has not been demonstrated.

A further development which demonstrates another interesting dimension of automatic speech analysis is the use of syntax and context to permit automatic recognition of more natural English utterances (sentences). Although the level of acoustic recognition is quite crude (five phonemically motivated sound classes) the system can successfully analyze and respond to sentences, e.g., "Pick up the large block on the left," spoken as a continuous utterance. The words employed, of course, must be distinct in terms of the five sound types used for acoustic recognition.

The automatic speech interpreter, as one embodiment of the present invention, is essentially an acoustic pattern recognition device. Acoustically isolated utterances, such as words or phrases, are normalized by an information-theoretic compression technique that removes the effect of talker cadence and to some degree the effect of speaker variability. The resulting 120-bit pattern is then correlated with reference patterns derived through a training process. The only requirement for accurate recognition is reasonable acoustic separation between the patterns. The system can be retrained on-line for new vocabularies, speakers or acoustic environments at the rate of about 5 seconds per vocabulary utterance. A voice command system using this technique has been demonstrated with a large number of vocabularies of up to 100 words and in several languages. A unique feature is the ability to operate the system over commercial telephone circuits.

An object of the present invention is to accept a signal input data and maintain a binary representation of such signal data within the system, thus conserving storage requirements.

Further objects of the invention will be more clearly understood from the following description taken in conjunction with the drawings wherein FIG. 1 is a basic schematic presentation of the system of the present invention;

The present invention provides a means for encoding and classifying signal data obtained from a multiplicity of property filters. This invention, when used in conjunction with a device such as that described in U.S. Pat. No. 3,582,559 entitled "Method and Apparatus for Interpretation of Time-Varying Signals," provides a highly efficient methodology for performing automatic pattern classification on time-varying signal data. In the device of the above-identified Patent, an isolated incoming command signal is sensed and accumulated in its entirety. The command signal is then compressed into a fixed number of pseudo-spectra. This fixed size pattern is then compared to a set of patterns representing the various command signals the device was trained to recognize. For a more detailed description of this device, reference is hereby made to said Patent. The use of this device together with the components as set forth in the present invention produces a fixed length binary pattern for each signal input. The binary pattern is input to a pattern classifier that is organized for a particular classification task by an estimation process that combines a multiplicity of binary patterns into a standard reference pattern. Classification is accomplished by comparing binary encoded patterns generated by a single signal occurrance with previously generated reference patterns.

The following technical description is presented in terms of a system designed to automatically classify human speech patterns on the basis of audio spectrum data. However, it is to be understood that the broad concepts of the invention are not specifically limited to a system for interpreting speech utterances.

Figure 1:
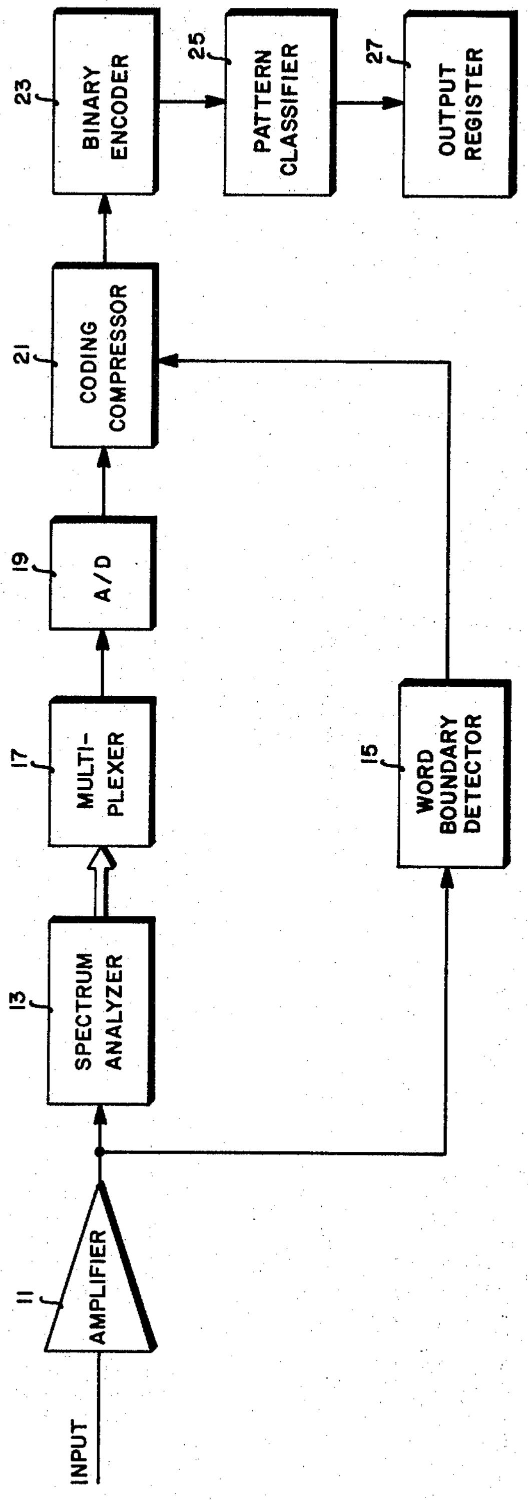

Turning now more specifically to the drawings, there is shown in FIG. 1 a speech input to an audio amplifier 11 which is, in turn, coupled to the input of a device comprising a multiplicity of property filters such as spectrum analyzer 13, and to a signal event detector such as word boundary detector 15.

The spectrum analyzer 13 is a well-known component and, in the specific instance described hereinafter, consists of a 16 audio frequency filter sections each being composed of a bandpass filter, a low pass filter and a detector.

The output of the spectrum analyzer 13 is converted from an analog to a digital signal by means of the multiplexer 17 and converter 19 both of which are well-known components. The converted data is transferred to the coding compressor means 21 whose pseudo-spectra are described in detail in the above-mentioned U.S. Patent. The output of the coding compressor 21 is transferred to the binary encoder 23 which will be described in detail hereinafter.

Figure 2:
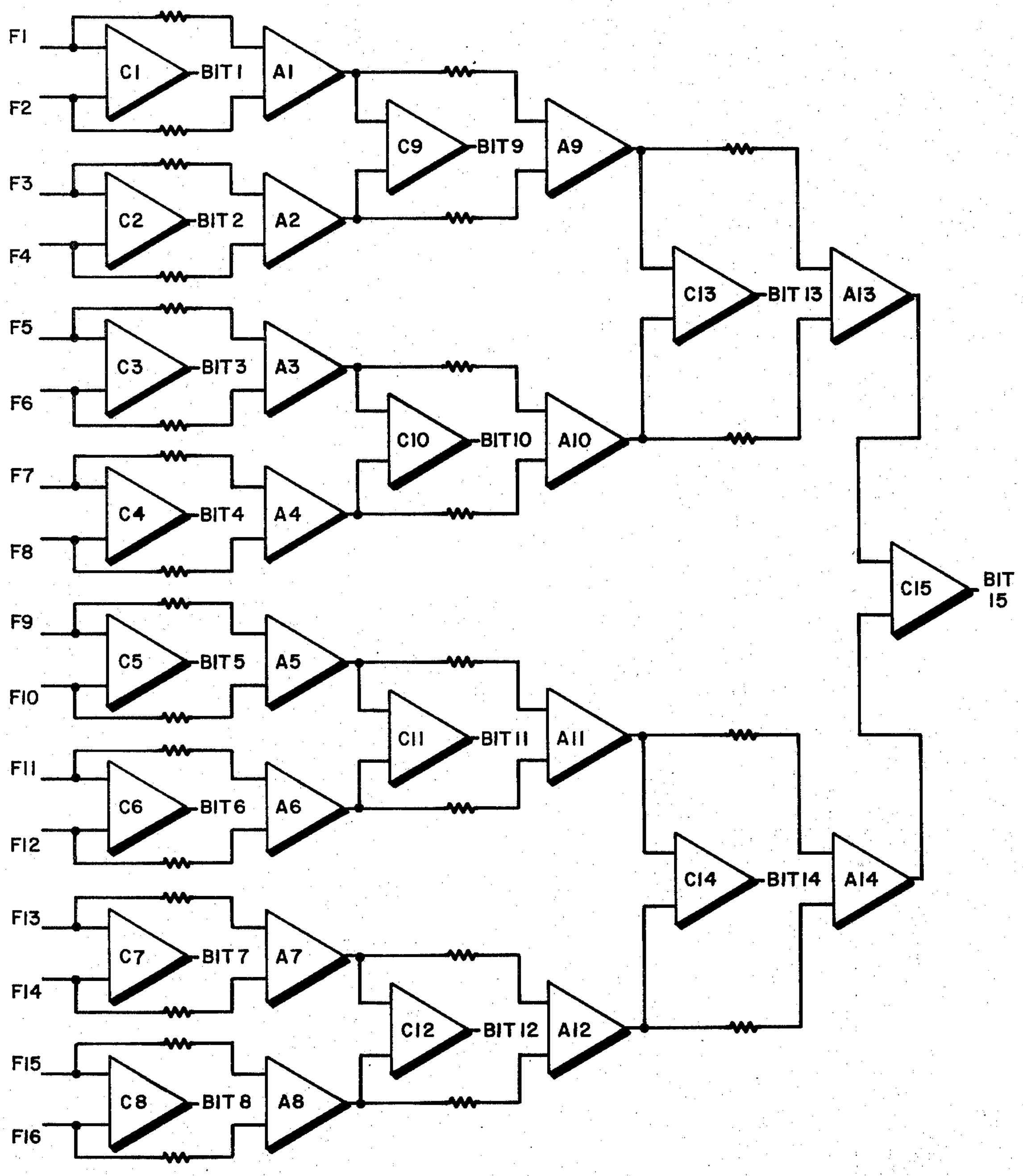
FIG. 2 is a logic diagram of the binary encoder of the present invention.

The binary encoder 23, as shown in detail in FIG. 2, produces a $2^N$-1 bit pattern description of the $2^N$ property filters. In the specific instance discussed, the encoder produces a fifteen bit pattern to describe each of the eight pseudo-spectra produced by the coding compressor. This pattern is then supplied to the pattern classifier 25 which is described in detail hereinafter. The pattern classifier 25 has two modes of operation. They are estimation and classification. In the estimation mode a multiplicity of binary patterns from a common signal class are combined to form a binary reference pattern. Reference patterns can be stored for any number of signal classes within the limits of the memory capacity of the classifier. In the classification mode an incoming encoded signal pattern is compared with each of the stored patterns and a class index output corresponding to the reference pattern most closely matching the incoming pattern. If none of the patterns match sufficiently well, no decision is made. The results of the classification process are stored in the output register 27 a well-known component.

The word boundary detector 15 controls the processing of data by the coding compressor 21. The word boundary detector may be any of the well-known detecting devices for providing this particular information, such as the VOX system as discussed in *The Radio Amateur's Handbook*, 39th Edition, 1962, p. 327.

The binary encoder 23 of FIG. 1 is shown in detail in FIG. 2. The binary encoder accepts as input sixteen voltage values provided by the coding compressor 21. Each of these values corresponds to the energy content of one of the sixteen bandpass filters summed over a time period determined by the coding compressor. These values are designated in FIG. 2 as $F_1$ through $F_{16}$ and define each of the fifteen bits produced by the encoder according to the relationships given in the following table.

BIT 1 = 1 if $F_1 \geq F_2$ otherwise BIT 1 = 0
BIT 2 = 1 if $F_3 \geq F_4$ otherwise BIT 2 = 0
BIT 3 = 1 if $F_5 \geq F_6$ otherwise BIT 3 = 0
BIT 4 = 1 if $F_7 \geq F_8$ otherwise BIT 4 = 0
BIT 5 = 1 if $F_9 \geq F_{10}$ otherwise BIT 5 = 0
BIT 6 = 1 if $F_{11} \geq F_{12}$ otherwise BIT 6 = 0
BIT 7 = 1 if $F_{13} \geq F_{14}$ otherwise BIT 7 = 0
BIT 8 = 1 if $F_{15} \geq F_{16}$ otherwise BIT 8 = 0
BIT 9 = 1 if $F_1+F_2 \geq F_3+F_4$ otherwise BIT 9 = 0
BIT 10 = 1 if $F_5+F_6 \geq F_7+F_8$ otherwise BIT 10 = 0
BIT 11 = 1 if $F_9+F_{10} \geq F_{11}+F_{12}$ otherwise BIT 11 = 0
BIT 12 = 1 if $F_{13}+F_{14} \geq F_{15}+F_{16}$ otherwise BIT 12 = 0
BIT 13 = 1 if $F_1+F_2+F_3+F_4 \geq F_5+F_6+F_7+F_8$ otherwise BIT 13=0
BIT 14 = 1 if $F_9+F_{10}+F_{11}+F_{12} \geq F_{13}+F_{14}+F_{15}+F_{16}$ otherwise BIT 14 = 0
BIT 15 = 1 if $F_1+F_2+F_3+F_4+F_5+F_6+F_7+F_8 \geq F_9+F_{10}+F_{11}+F_{12}+F_{13}+F_{14}+F_{15}+F_{16}$ otherwise BIT 15 = 0

This logic is accomplished in a series of voltage comparators and summing amplifiers configured according to FIG. 2.

In this way, each of the eight pseudo-spectra produced by the coding compressor is described by a set of fifteen bits resulting in a 15 × 8 or 120 bit pattern for every utterance input to the system.

Figure 3:
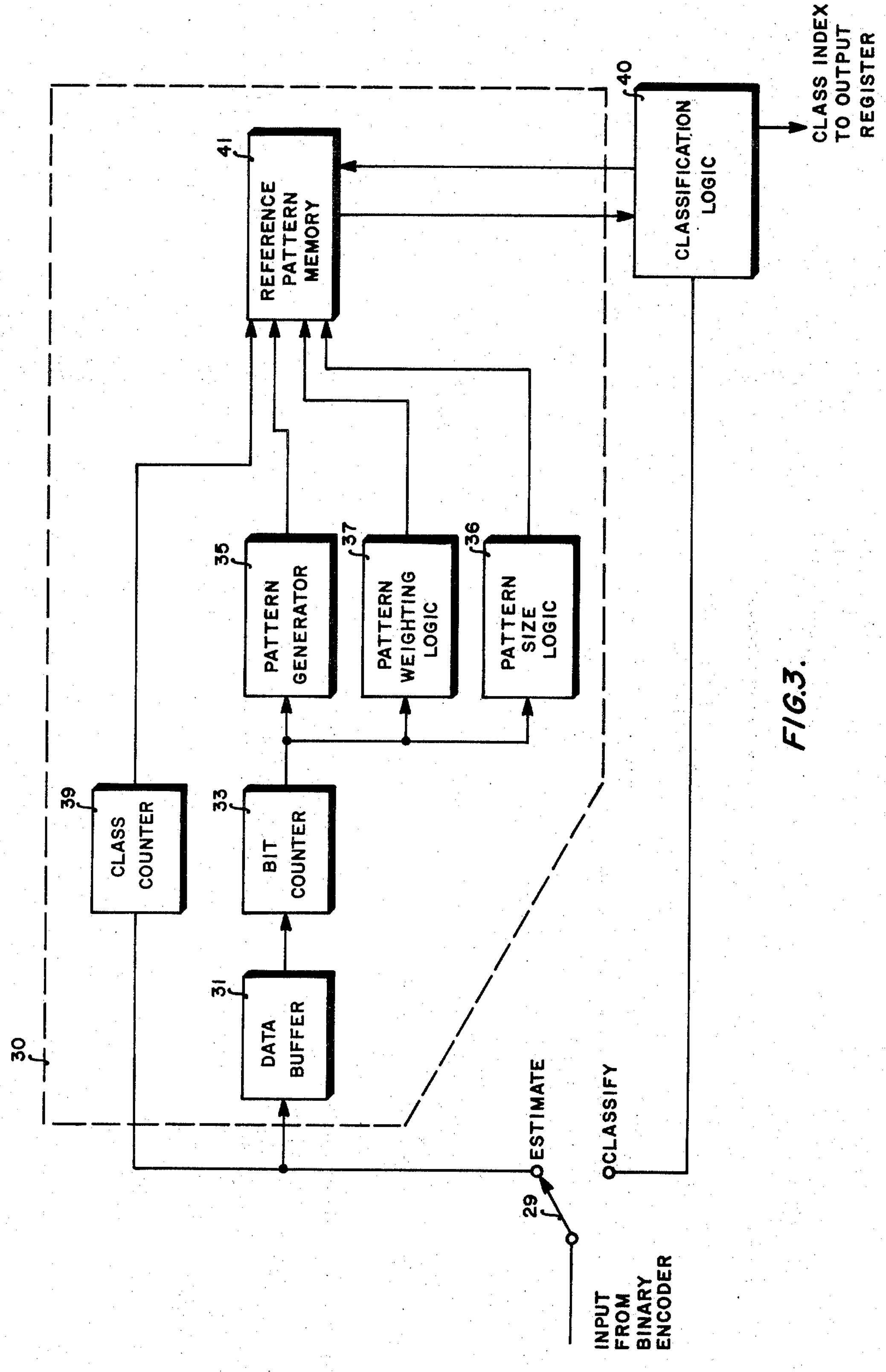
FIG. 3 is a schematic presentation of the pattern classifier of the present invention.

The pattern classifier 25 of FIG. 1 is shown schematically in FIG. 3. The two modes of operation, "estimate" and "classify" are controlled by a switch 29 located on the front panel of the equipment. The system shown within dashed line block 30 includes the estimation logic of the pattern classifier while that shown within block 40 includes the classification logic. The classification logic will be discussed in detail in connection with FIG. 7.

In the "estimate" mode of operation the binary encoded patterns obtained from five repetitive utterances of a command word are stored in the data buffer 31. The bit counter 33 determines the number of one bits in each position of the 120 bit binary reference pattern. A class weighting pattern is determined via the pattern weighting logic 37 to be described. The function of the pattern generator and pattern weighting logic is described in further detail hereinafter. The binary reference pattern, weighting pattern and the class index obtained via the class counter 39 are stored in the reference pattern memory 41. The class index is relayed to the output register 27 of FIG. 1.

Figure 4:
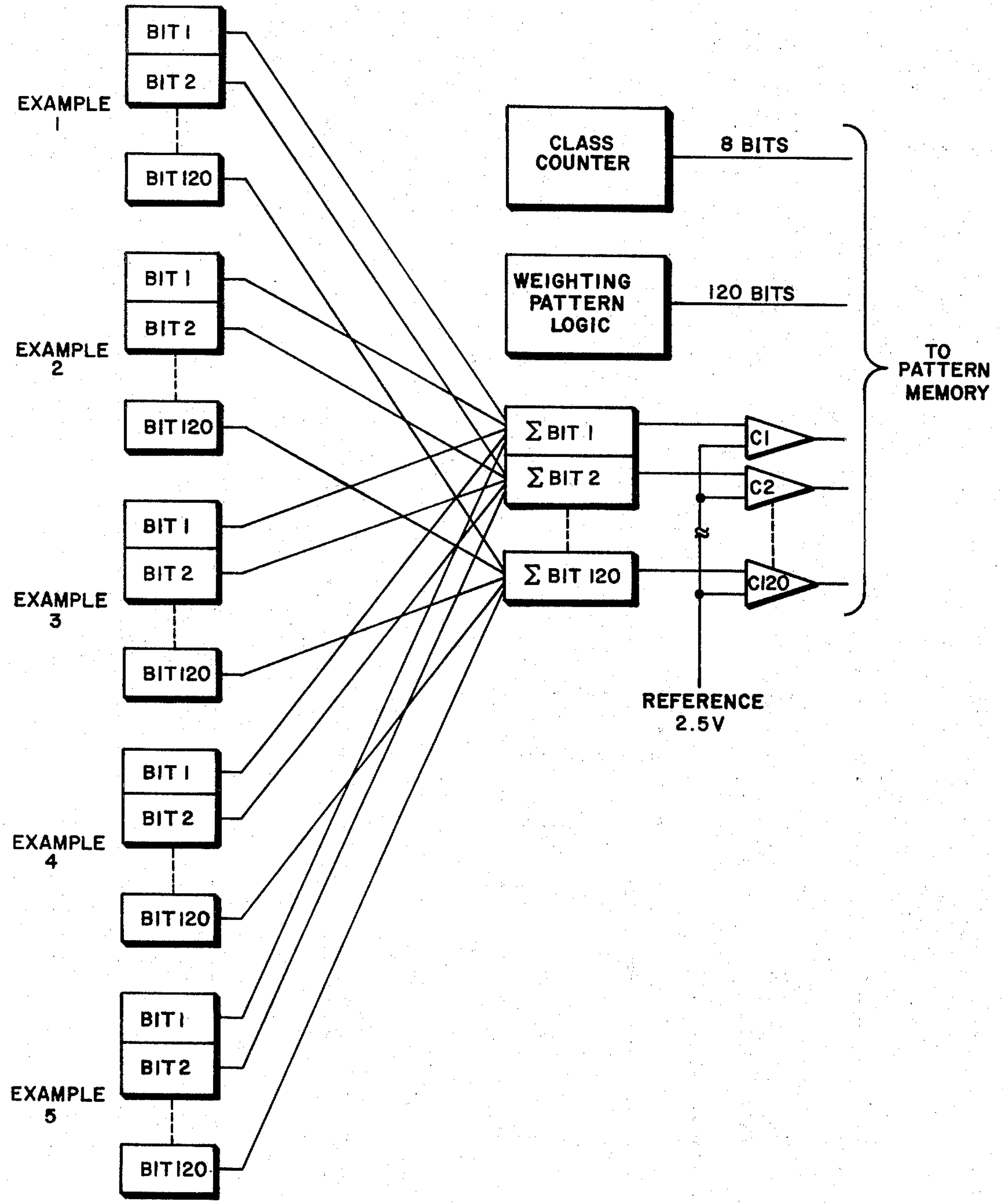
FIG. 4 is a diagram of the estimation logic of the pattern classifier.
Figure 5:
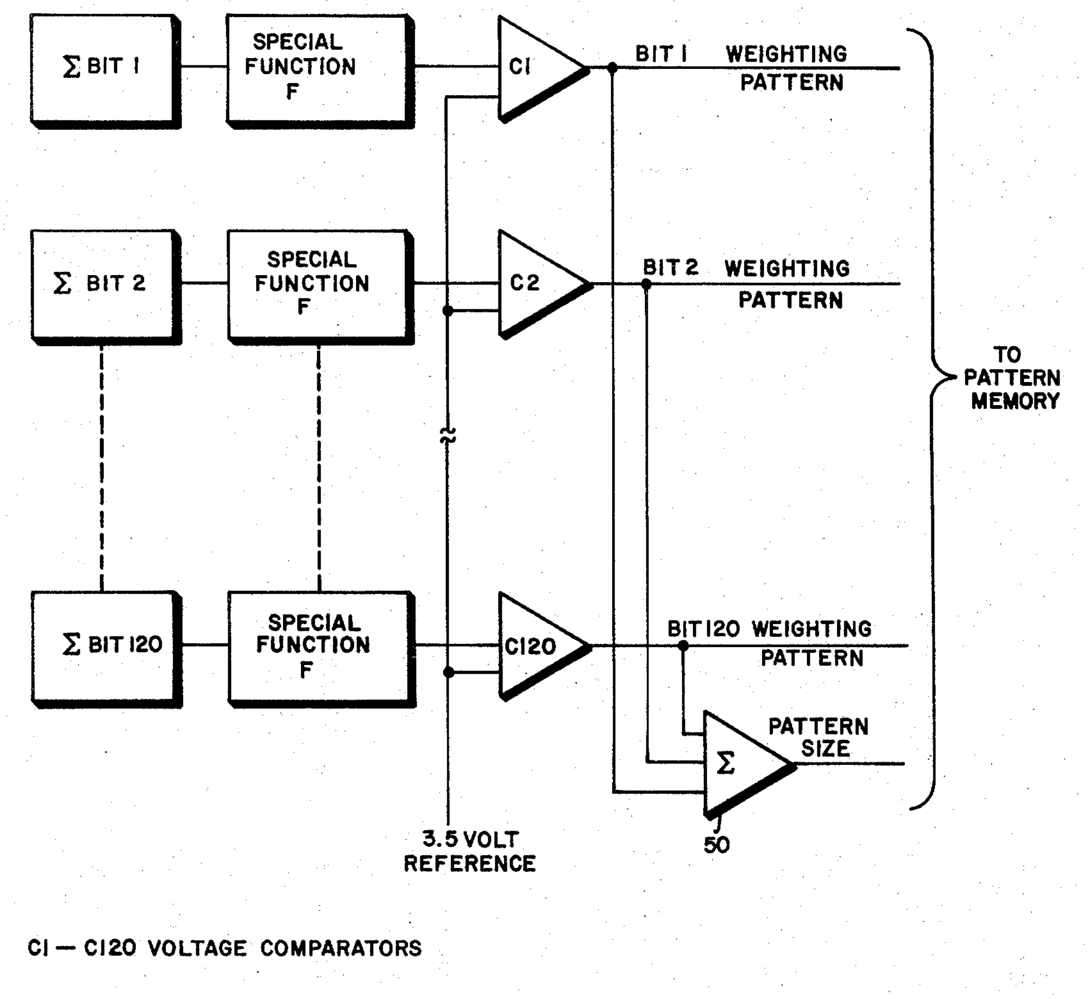
FIG. 5 is a diagram of the weighting pattern of logic of the pattern classifier.
Figure 6:
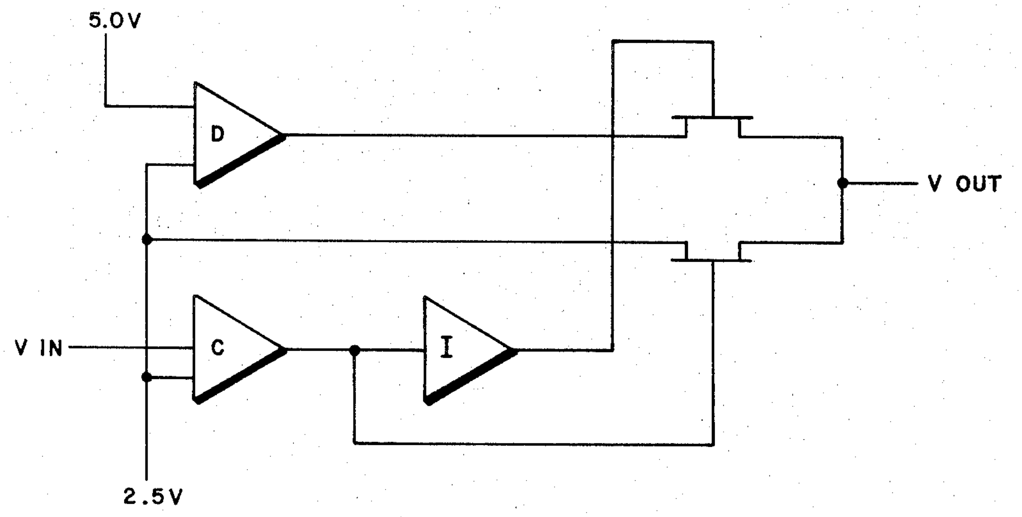
FIG. 6 is a logic diagram for the special function, F, associated with the weighting pattern logic, of the pattern classifier.

Training the machine to recognize each of a set of utterances is accomplished by the following estimation method. A plurality of examples, such as five, of an utterance are input to the machine, compressed, encoded and temporarily stored in an equal number of 120 memory cells, as shown in FIG. 4. Each cell then contains either a logical one or logical zero which, for the purpose of this illustration, shall be assumed to be either +1o volts or 0 volts respectively. The five examples of the utterance have each contributed one sample of each of the bits 1 through 120. The five samples of each of the bit positions are summed, producing 120 sums ranging in value from zero to five volts. Each of these sums is then compared to a reference level of 2.5 volts. If the sum exceeds this value, a logical "one" appears at the output of this comparator, otherwise a logical "zero" appears at the comparator output. The set of 120 logic levels (bits) thus produced constitutes the reference pattern to be stored in memory to represent that particular utterance input to the machine in the training sequence. In addition to the reference pattern, an 8 bit binary number and a weighting pattern are stored. The first is simply the binary number assigned to the utterance last input to the machine. This number, termed the class index, will be used as an identification number for that utterance during the recognition process. The weighting pattern stored is determined according to logic shown in FIGS. 5 and 6. Each of the 120 sums ranging in value from zero to five volts is transformed by function F shown in FIG. 6 to a voltage level between 3 and 5 volts as indicated by the logic and circuitry shown. The table indicates the respective inputs and outputs. This level corresponds to the consistency of either zeros or ones in each bit position. That is, if a bit position contained a one for all five examples, resulting in a five volt level, it would contribute five volts to the summing amplifier 50 in FIG. 5. If the bit position contained all zeros it would also contribute 5 volts to the summing amplifier 50. Any mix of ones and zeros in a bit position would contribute less than 5 volts. In this way the consistency of each bit position is measured, given a binary volue of 1 if the voltage exceeds 3 volts and zero otherwise and entered into memory 41. This 120 bit pattern will then be used to eliminate from the correlation process those bits that are not consistent for a particular vocabulary item. The number of 1 bits in this pattern are then counted and entered into memory 41. This number will be used by the classifier as an upper bound on the number of matching bits between new pattern and a previously stored reference pattern, for each class. It is termed "pattern size" and is a number from 0 to 120.

Figure 7:
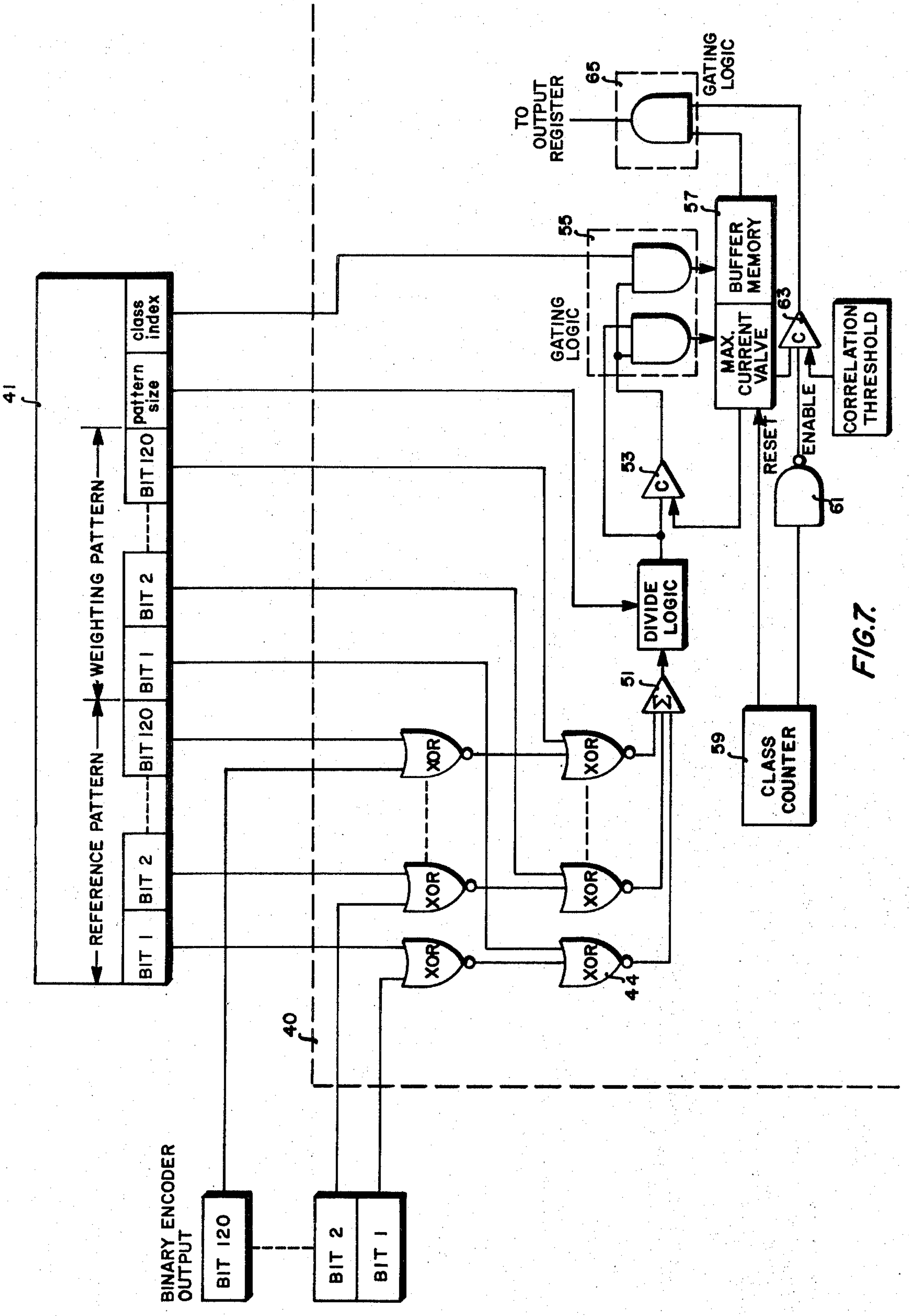
FIG. 7 is a diagram of the classification logic of the pattern classifier.

The classification logic 40 is detailed in FIG. 7 wherein 120 bit binary patterns generated by the binary encoder 23 of FIG. 1 are compared with 120 bit patterns stored in the reference pattern memory 41 of FIG. 3 by means of a multiplicity of 120 exclusive OR gates 49. For each of the 120 bit positions, if the encoder output matches the stored reference pattern, a "zero" is presented to the second set of exclusive or gates. If the encoder and reference pattern bits do not match, a "one" is presented to the second set of exclusive gates. The inverted outputs of these gates are then compared to the stored class weighting pattern via the second set of exclusive or gates. If a match is encountered, a "one" is added to the summing circuit 51 otherwise a "zero" is added. Thus, the content of the summing circuit divided by the pattern size represents the correlation value between the encoder output and the reference pattern connected to the multiplicity of exclusive OR gates 49, having eliminated those bits shown to be not consistently "ones" or "zeros." A further class counter 59 sequences once through the totality of stored reference patterns during the classification process associated with each input from the binary encoder.

The content of the summing circuit 51 is compared via comparator 53 with the previous maximum correlation value stored in buffer memory 57 which contains the maximum correlation value, and class index. If the current value of the summing circuit exceeds the previously stored maximum, gate 55 is enabled and the maximum correlation value and class index stored in buffer memory 57 are replaced with the corresponding values of the reference pattern indexed by the class counter 59. Thus, after sequencing once through all stored reference patterns, the maximum correlation value and class index are held in the buffer memory 57. At this point the class counter enables comparator 63 and the maximum correlation value is compared with an adjustable threshold. If the maximum correlation value exceeds the threshold, gate 65 is enabled and the class index is transferred to the output register 27 of FIG. 1. If the maximum correlation value fails to exceed the threshold, gate 65 is inhibited and a special "no decision" code is transferred to the output register.

At the end of each classification process, the contents of the buffer memory 57 are set to zero via the reset circuit which is controlled by the class counter 59.

The above described invention provides a system for encoding and classifying signal data which maintains a binary representation of the data within the system. This results in a substantial reduction of storage requirements.

It is to be understood that the above description and accompanying drawings are for purposes of description. Variations including substitution of various components may occur without departing from the scope of the invention as set forth in the following claims.

I claim:

1. A signal pattern encoder and classifier comprising a plurality of property filter means for receiving a signal input, coding compressor means coupled to the output of said property filter means for providing a plurality of voltage values equal in number to said filters, said values being summed over a time period determined by said coding compressor, signal event detector means coupled in parallel with said property filter means for controlling said compressor means, binary encoder means coupled to the output of said compressor means for providing a bit pattern description of said voltage values provided by said coding compressor, and pattern classifier means coupled to the output of said binary encoder means for comparing the output of said encoder means to a reference pattern previously established by said classifier means.

2. The encoder and classifier of claim 1 further comprising register means coupled to the output of said classifier means.

3. The encoder and classifier of claim 1 further comprising an analog-to-digital converter coupled between said compressor and said filter means.

4. The encoder and classifier of claim 1 wherein said multiplicity of property filter means comprises a spectrum analyzer.

5. The encoder and classifier of claim 1 wherein said signal event detector means comprises a word boundary detector.

6. The encoder and classifier of claim 1 wherein said binary encoder means comprises a plurality of voltage comparators coupled to the outputs of said coding compressor for providing a multiplicity of comparisons of the outputs of said coding compressor.

7. An acoustic pattern recognition device comprising a plurality of property filter means for receiving an audio input, coding compressor means coupled to the output of said property filter means, said compressor means providing a plurality of voltage values summed over a time period, signal event detector means coupled in parallel with said filter means for controlling said coding compressor means, binary encoder means coupled to the output of said compressor means for providing a bit pattern description of said voltage values provided by said compressor means, and pattern classifier means coupled to the output of said binary encoder means for comparing the output of said encoder means to a reference pattern previously established by said classifier means.

8. The pattern recognition device of claim 7 further comprising register means coupled to the output of said pattern classifier means.

9. The pattern recognition device of claim 7 further comprising an anolog-to-digital converter coupled between said coding compressor means and said filter means.

10. The pattern recognition device of claim 7 wherein said signal event detector comprises a word boundary detector.

11. The pattern recognition device of claim 7 wherein said coding compressor means includes a plurality of bandpass filters equal in number to said property filter means wherein said binary encoder means comprises a plurality of voltage comparators coupled to the outputs of said coding compressor means for providing a multiplicity of comparisons of the outputs of said coding compressor means.

12. In an encoding device, a coding compressor means having a plurality of outputs, said compressor means providing a plurality of voltage values summed over a time period determined by said compressor means, a binary encoder comprising a plurality of voltage comparator means coupled to the outputs of said coding compressor for providing a multiplicity of comparisons of the outputs of said coding compressor means, and pattern classifier means coupled to the output of said binary encoder for comparing said output of said encoder to a reference pattern previously established.

13. The device of claim 12 wherein said voltage comparator means comprises a series of voltage comparators, and a plurality of summing amplifiers coupled to said voltage comparators.

* * * * *